Jan. 15, 1963  D. J. HADLEY ETAL  3,073,753
RECOVERY OF ACRYLONITRILE
Filed May 19, 1960  2 Sheets-Sheet 1
Fig. I
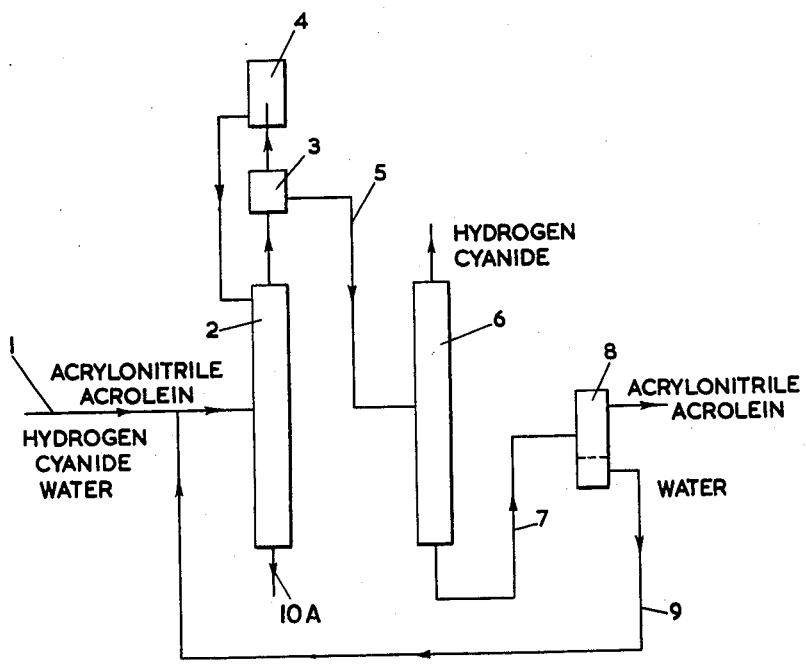
INVENTORS.
DAVID JAMES HADLEY.
DAVID GORDON STEWART.
ATTORNEYS.

Jan. 15, 1963  D. J. HADLEY ETAL  3,073,753
RECOVERY OF ACRYLONITRILE
Filed May 19, 1960  2 Sheets-Sheet 2
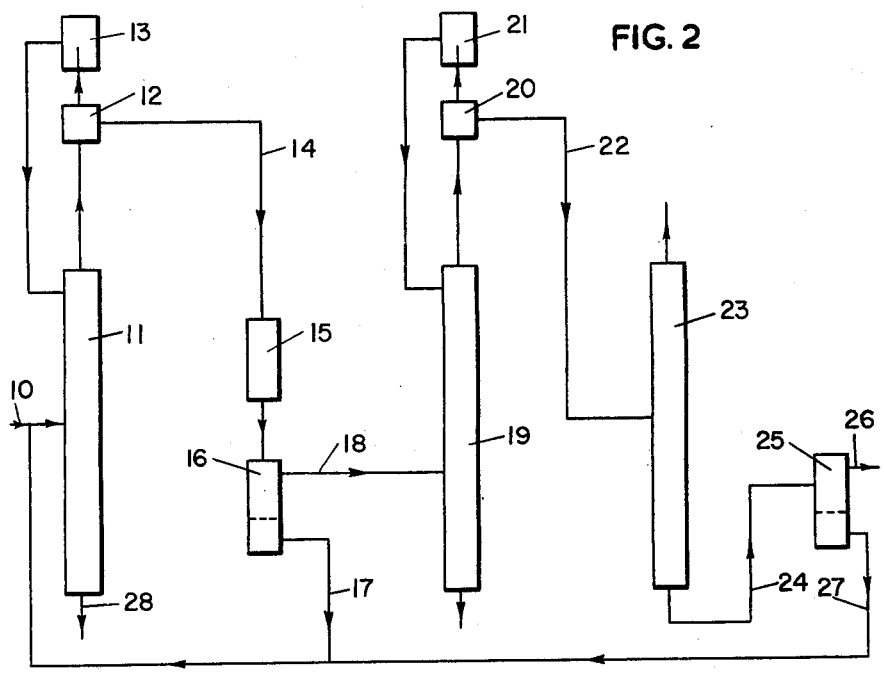
INVENTORS.
DAVID JAMES HADLEY.
DAVID GORDON STEWART.
BY
Ward, Neal, Haselton, Orme & McElhannon
ATTORNEYS.

United States Patent Office 3,073,753
Patented Jan. 15, 1963

3,073,753
RECOVERY OF ACRYLONITRILE
David James Hadley, Epsom Downs, and David Gordon Stewart, Epsom, England, assignors to The Distillers Company Limited, Edinburgh, Scotland, a British company
Filed May 19, 1960, Ser. No. 30,717
Claims priority, application Great Britain Oct. 10, 1957
4 Claims. (Cl. 202—42)

The present invention relates to the recovery of acrylonitrile from reaction products containing it, and is a continuation in part of our application Serial Number 764,444, filed on September 30, 1958, now abandoned.

The production of acrylonitrile by the reaction of proplyene or acrolein at elevated temperatures in the vapour phase with ammonia and molecular oxygen, in the presence of a catalyst, is known. In such reactions the crude unsaturated nitrile is usually recovered in the form of a solution by washing the gaseous reaction product, preferably after neutralisation of unreacted ammonia, with a suitable solvent such as water. The crude nitrile solution also contains varying amounts of unreacted acrolein and hydrogen cyanide.

Hitherto, it has not been possible to remove completely these impurities from the acrylonitrile by straightforward fractional distillation methods, although the boiling points of the different substances differ widely. This was found to be the result of the combination of the acrolein with the hydrogen cyanide to form an unstable high boiling condensation product, and its subsequent decomposition.

According to the present invention the process for the removal of hydrogen cyanide from a mixture of water, acrylonitrile, hydrogen cyanide and acrolein, comprises distilling the mixture to take off overhead a fraction containing water, acrylonitrile, hydrogen cyanide and acrolein, and feeding this overhead fraction without condensation to a subsequent still which is operated continuously under such conditions that the hydrogen cyanide is removed substantially completely in an overhead fraction and acrylonitrile is recovered as the base product.

It has been discovered that negligible formation of condensation product takes place in the subsequent still if the acrylonitrile/water overhead fraction is fed directly to that still in the vapour phase, even though both hydrogen cyanide and acrolein are present in the still in the liquid phase.

In the known process referred to above, acrylonitrile is prepared by the reaction of propylene or acrolein with ammonia and molecular oxygen at an elevated temperature in the vapour phase in the presence of a catalyst. The acrylonitrile is advantageously recovered from the gaseous reaction product by washing first with dilute acid for the removal of unreacted ammonia, and then with water which scrubs out the acrylonitrile. Since some of the acrylonitrile also dissolves in the dilute acid solution, this is preferably combined subsequently with the solution obtained from the water scrubber. The dilute solution of acrylonitrile thus obtained also contains varying amounts of acrolein and hydrogen cyanide, and is a starting material to which the process of the present invention may be applied.

In one form of the present invention, the dilute aqueous solution containing acrylonitrile obtained from the water scrubber is submitted to distillation in a first still in which the acrylonitrile together with the acrolein and hydrogen cyanide is taken off overhead together with some of the water, while the greater part of the water is removed as the base product. In a preferred embodiment, the dilute aqueous solution of acrylonitrile is fractionated in the first still whereby the acrylonitrile/water azeotrope, which contains about 12% of water, is taken off as the overhead fraction. A vapour divider is suitably provided at the head of the first still to enable a proportion of the overhead fraction to be condensed and returned to the still as reflux. The overhead fraction from the first still is passed in vapour form to a second still operated continuously in which hydrogen cyanide together with some of the acrolein is removed as an overhead fraction, and acrylonitrile, mixed with acrolein and water, but substantially free from hydrogen cyanide and condensation product is recovered as the base product. The second still is advantageously operated under reduced pressure. The base product from the second still separates into two phases, of which the lower aqueous phase containing some dissolved acrylonitrile is advantageously recycled to the preliminary distillation in the first still. Pure acrylonitrile may be recovered from the upper organic phase.

In a further form of the present invention the dilute aqueous solution containing acrylonitrile is concentrated by distillation in a first still to provide an overhead fraction consisting of the acrylonitrile together with the acrolein, hydrogen cyanide and some water, while the greater part of the water is removed as base product. The overhead fraction from this first still is condensed and the condensate separates into two phases. The lower aqueous phase containing some dissolved acrylonitrile, is advantageously recycled to the still, while the upper organic phase is vaporised to provide an overhead fraction containing acrylonitrile, hydrogen cyanide, acrolein and some water. The overhead fraction from the vaporisation stage is passed in vapour form to a further still operated continuously in which hydrogen cyanide, together with some of the acrolein, is removed as an overhead fraction, and acrylonitrile, mixed with acrolein and water, is substantially free from hydrogen cyanide and condensation products, is recovered as base product. The vaporisation of the condensed organic layer and the subsequent distillation to remove hydrogen cyanide may advantageously be carried out under reduced pressure. Again, the base product of the final distillation separates into two phases, of which the lower aqueous phase containing some dissolved acrylonitrile is advantageously recycled to the preliminary distillation in the first still. Pure acrylonitrile may be recovered from the upper organic phase. Any suitable method for vaporising the condensed overhead fraction from the first stage may be employed, provided that the conditions of vaporising are such as to ensure that acrylonitrile and lower boiling impurities are vaporised, and high boiling condensation products of aldehyde and hydrogen cyanide remain behind as liquid. Preferably the vaporisation is carried out in a still.

The accompanying drawings each illustrate one method of carrying out the present invention.

FIGURE 1 is a flow diagram of a process according to the invention incorporating two distillation stages.

FIGURE 2 is a flow diagram of a process according to the invention incorporating three distillation stages.

Referring to FIGURE 1, a dilute aqueous solution of acrylonitrile containing acrolein and hydrogen cyanide as impurities is introduced by line 1 into still 2. Water is removed from still 2 by line 10A and acrylonitrile as an azeotrope with water is taken off overhead together with hydrogen cyanide and acrolein. The still 2 is provided with a vapour divider 3 and a condenser 4. The vapour divider separates part of the overhead fraction, which is condensed in the condenser 4 and returned to the still 2 as liquid reflux. The remainder of the overhead fraction is passed in vapour form by line 5 to the continuous still 6 in which hydrogen cyanide together with some of the acrolein is removed as an overhead fraction, and acrylonitrile mixed with acrolein and water, but substantially free from hydrogen cyanide and condensation product is removed from the base and introduced by line 7 to the separator 8. In the separator two phases separate, of which the lower aqueous phase is recycled by line 9 to still 2. The upper acrylonitrile phase containing acrolein and water, but no hydrogen cyanide, may be further treated for the recovery of pure acrylonitrile.

Referring to FIGURE 2, a dilute aqueous solution of acrylonitrile containing acrolein and hydrogen cyanide as impurities is introduced by line 10A into still 11. Water is removed from still 11 by line 28 and acrylonitrile, as an azeotrope with water together with acrolein and hydrogen cyanide, is taken off overhead. The still 11 is provided with a vapour divider 12 and a condenser 13. The vapour divider separates part of the overhead fraction, which is condensed in the condenser 13 and returned to the still 11 as liquid reflux. The remainder of the overhead fraction is passed in vapour form by line 14 to the condenser 15 from which the condensed reaction products are fed to separator 16.

The lower aqueous phase is removed from separator 16 and recycled to still 11 through pipe 17 and pipe 10A, while the upper organic phase passes through pipe 18 to still 19 which is equipped with vapour divider 20 and condenser 21 whose functions are similar to those of vapour divider 12 and condenser 13. The overhead fraction from vapour divider 20 passes in the vapour phase through pipe 22 to the continuous still 23 in which hydrogen cyanide together with some of the acrolein is removed as an overhead fraction, and acrylonitrile, mixed with acrolein and water, but substantially free from hydrogen cyanide and condensation product is removed from the base, and introduced by line 24 to the separator 25. As described above in relation to separator 8 in FIGURE 1 the aqueous phase from separator 25 is recycled by line 27 to still 11, while the organic phase is taken off at 26, and may be further treated for the recovery of pure acrylonitrile.

In order to prevent polymerisation of acrolein and/or acrylonitrile during any of the distillations described above, it is desirable to carry out these operations in the presence of a conventional polymerisation inhibitor such as hydroquinone, pyrogallol, tertiary butyl catechol, etc. The presence of an inhibitor in the continuous still in which hydrogen cyanide is finally removed from the mixture in either the two-stage or the three-stage process is especially desirable.

The present invention is further illustrated with reference to the following examples.

*Example 1*

A mixture of acrolein, ammonia and air was passed in the vapour phase over a molybdic oxide catalyst so as to produce acrylonitrile. The gas leaving the reactor, containing acrylonitrile, acrolein and hydrogen cyanide in the molar ratio of 6:1:1, was scrubbed first with dilute sulphuric acid for the removal of ammonia, and subsequently with water. The acid and water extracts were combined and introduced, at a temperature of about 80° C. into a first continuous still of about 30 theoretical plates, from which a fraction consisting of an acrylonitrile/water azeotrope containing also hydrogen cyanide and acrolein was taken off overhead, while water was removed as base product. Reflux was provided at the top of the still by a cold finger, and the temperature of this and the boil-up rate were so adjusted that the head temperature was 65° C. The acrylonitrile/water azeotrope, containing 74% of acrylonitrile, 3.8% of hydrogen cyanide, and 8.8% of acrolein, was introduced, without cooling, as a vapour into a second continuous still of about 50 theoretical plates, the reflux ratio being 10:1 and the head temperature 48° C. Approximately 1 part of pyrogallol in strong aqueous solution was introduced into the still for every thousand parts of feed, as a polymerisation inhibitor.

In this still, hydrogen cyanide together with some acrolein was removed as an overhead fraction, and acrylonitrile containing 4% acrolein and acrolein cyanhydrin equivalent to 0.1% hydrogen cyanide, but no free hydrogen cyanide, was removed as base product in admixture with some water, and passed to a separator in which two phases separated. The upper acrylonitrile phase which contained 4.6% of acrolein, 2.2% of water and only a trace of acrolein cyanhydrin, was removed and treated for the recovery of pure acrylonitrile. The aqueous phase from the separator, containing small amounts of dissolved acrylonitrile, was recycled to the first continuous still.

In this example, each distillation was carried out substantially at atmospheric pressure.

*Example 2*

The acid and water extracts of the gaseous reaction product of acrolein, ammonia and air, obtained as in Example 1, were combined and fed to a first continuous still from which an acrylonitrile/water azeotrope, containing also hydrogen cyanide and acrolein, was taken off overhead. This overhead fraction was condensed, and separated into organic and aqueous phases. The upper organic phase contained 83% w./w. acrylonitrile, 10% w./w. acrolein, 3% w./w. water and 4% w./w. total hydrogen cyanide. The expression total hydrogen cyanide refers to the aggregate of free hydrogen cyanide and hydrogen cyanide combined in the form of acrolein cyanhydrin.

The upper organic phase was revaporised in a revaporising still with a reflux ratio of 1:1 and a head temperature of 70–75° C. The vapour issuing from the head of this still was fed without condensation into a second continuous still of about 50 theoretical plates, the reflux ratio being 10:1 and the head temperature 47.5° C.

In this last still, hydrogen cyanide and acrolein were removed as an overhead fraction and acrylonitrile containing 6.5% acrolein and acrolein cyanhydrin equivalent to 0.033% hydrogen cyanide, together with some water, was removed as base product; no free hydrogen cyanide was present in this base product.

In this example each of the distillations was carried out substantially at atmospheric pressure.

Throughout the process of this example, one part by weight of pyrogallol in strong aqueous solution was introduced into each still for every thousand parts by weight of feed, as a polymerisation inhibitor.

We claim:
1. The process for the removal of hydrogen cyanide from a mixture of acrylonitrile, hydrogen cyanide, acrolein and water which comprises distilling the mixture, taking off overhead an azeotrope in vapor form of acrylonitrile and water, containing also acrolein and hydrogen cyanide, feeding the overhead fraction in the vapor phase, without cooling, to a second still, separating the hydrogen cyanide overhead as a gas and recovering acrylonitrile with acrolein, but substantially free from hydrogen cyanide, as base product.

2. The process which comprises distilling a mixture of acrylonitrile, acrolein, hydrogen cyanide and water, taking off overhead an azeotrope in vapor form of acrylonitrile and water containing also acrolein and hydrogen cyanide, feeding the overhead fraction in the vapor phase, without cooling, to a second still, separating the hydrogen cyanide overhead as a gas and recovering partly purified acrylonitrile with acrolein but substantially free from hydrogen cyanide, allowing the partly purified product to separate into an acrylonitrile phase and a water phase containing a small amount of acrylonitrile and recycling the water phase to said distilling mixture.

3. The process which comprises distilling a dilute aqueous solution of acrylonitrile containing also acrolein and hydrogen cyanide in a first stage, taking off overhead an azeotrope of acrylonitrile and water containing also acrolein and hydrogen cyanide, condensing this overhead fraction to form an organic phase and a water phase, separating the phases, recycling the water phase, distilling the organic phase in a second stage, taking off overhead a second azeotrope of acrylonitrile and water containing also acrolein and hydrogen cyanide, feeding this overhead fraction in the vapor phase, without cooling, to a third stage which comprises a still separating in this still the hydrogen cyanide as a gas, recovering partly purified acrylonitrile with acrolein, but substantially free from hydrogen cyanide, as base product, allowing the partly purified product to separate into an acrylonitrile phase and a water phase containing a small amount of acrylonitrile and recycling the water phase to said dilute aqueous solution.

4. The process as claimed in claim 1 wherein the second still is operated under reduced pressure.

References Cited in the file of this patent

UNITED STATES PATENTS

| | | |
|---|---|---|
| 2,324,854 | Kurtz et al. | July 20, 1943 |
| 2,672,434 | MacFarlane | Mar. 16, 1954 |
| 2,672,435 | Shoptaw | Mar. 16, 1954 |
| 2,719,169 | Croes et al. | Sept. 27, 1955 |
| 2,733,259 | Croes et al. | Jan. 31, 1956 |
| 2,793,227 | Sadle | May 21, 1957 |
| 2,836,614 | Bewley | May 27, 1958 |
| 2,838,560 | Luscher | June 10, 1958 |

FOREIGN PATENTS

| | | |
|---|---|---|
| 484,453 | Canada | July 1, 1952 |

OTHER REFERENCES

"Fiat Final Report No. 836," July 18, 1946 (pages 4, 5 and 15 relied upon).